United States Patent [19]
McNary et al.

[11] Patent Number: 5,963,653
[45] Date of Patent: Oct. 5, 1999

[54] HIERARCHICAL INFORMATION FUSION OBJECT RECOGNITION SYSTEM AND METHOD

[75] Inventors: Charles McNary; Kurt Reiser; David M. Doria; David W. Webster; Yang Chen, all of Los Angeles, Calif.

[73] Assignee: Raytheon Company, Lexington, Mass.

[21] Appl. No.: 08/878,863

[22] Filed: Jun. 19, 1997

[51] Int. Cl.[6] .............................. G06K 9/00; G06K 9/62; G01S 13/00; G01S 13/58
[52] U.S. Cl. ........................ 382/103; 382/228; 382/190; 342/64; 342/109
[58] Field of Search .................................... 382/100, 103, 382/190, 228; 342/62, 64, 104, 109

[56] References Cited

U.S. PATENT DOCUMENTS

| | | | |
|---|---|---|---|
| 5,123,057 | 6/1992 | Verly et al. | 382/156 |
| 5,260,709 | 11/1993 | Nowakowski | 342/62 |
| 5,262,968 | 11/1993 | Coffield | 364/604 |
| 5,341,142 | 8/1994 | Reis et al. | 342/64 |
| 5,458,041 | 10/1995 | Sun et al. | 89/1.11 |
| 5,519,618 | 5/1996 | Kastner et al. | 701/120 |
| 5,801,970 | 9/1998 | Rowland et al. | 364/578 |
| 5,818,383 | 10/1998 | Stockburger | 342/109 |

OTHER PUBLICATIONS

Multiple target classification using an unsupervised hybrid neural network (IEEE Publication 0–7803–1901–X/94), 1994.

Automatic target recognition fuses sensors and artificial intelligence (Defense Electronics, V 16, P 106(7), 1984.

Applications and science of artificial neural networks (SPIE, vol. 2492, Part one of two), 1995.

On–platform radar and optical track fusion (IEEE Publication 1058–6393/93), 1993.

Multi Sensor Data Fusion within Hierarchical Neural Networks, Rajapakse et al; IEEE International Joint Conference on Neural Networks; vol. 2, pp. 17–22, Jun. 1990.

Unsupervised Learning Neural Networks with Applications to Data Fusion, Chin–Der Wann et al; IEEE American Control Conference, pp. 1361–1365, 1994.

A Boolean Algebra Approach to Multiple Sensor Voting Fusion, L. A. Klein; IEEE Transaction on Aerospace and Electronic Systems, vol. 29, pp. 317–327, Apr. 1993.

*Primary Examiner*—Jon Chang
*Assistant Examiner*—Mehrdad Dastouri
*Attorney, Agent, or Firm*—Colin M. Raufer; Leonard A. Alkov; Glenn H. Lenzen, Jr.

[57] ABSTRACT

A hierarchical object recognition method for aggregation, interpretation and classification of information from multiple sensor sources on the detection feature attribute level. The system extracts information derived from each sensor source to obtain detections and their feature attributes. At least two processing streams, one for each sensor source, are provided for converting the detections and their feature attributes into hypotheses on identity and class of detected objects. The detections are shared and combined between the two processing streams using hierarchical information fusion algorithms to determine which ones of the hypotheses on identity and class of detected objects have sufficient probabilities for classifying the information.

29 Claims, 4 Drawing Sheets

Fig. 4

HIERARCHICAL INFORMATION FUSION OBJECT RECOGNITION SYSTEM AND METHOD

This invention was made with United States Government support under Contract No. F33615-94-DI420 awarded by the U.S. Air Force, Wright Laboratory. The United States Government has certain rights in this invention.

FIELD OF THE INVENTION

The present invention relates generally to the field of object recognition systems. In particular, this invention relates to a hierarchical information fusion object recognition system.

BRIEF DESCRIPTION OF THE PRIOR ART

Conventional object recognition systems typically operate with images from a single sensor, or with images from multiple sensors that have common imaging formats and viewing geometries. These multi-sensor systems register images at the pixel level, interpret derived features using statistical methods and fuse classification/recognition decisions derived from independent parallel processing streams. The disadvantages of these methods include:

1) uncertainty in pixel registration and resulting relationships between pixel-based features derived from the individual imaging modalities;
2) increased false alarms at the detection stage of processing, since the uncorrelated characteristics of clutter are not exploited between the imaging modalities;
3) increased misclassification of target candidates, since unique feature information in the multiple imaging modalities is not shared prior to making classification/recognition decisions;
4) brittleness of the recognition performance outside of the trained domain of the statistical classifiers; and
5) required sufficient processor throughput to sustain two or more independent processing streams for the corresponding sensor modalities.

Additionally, these systems do not address the difficult registration problem associated with multiple sensors that have different imaging formats and different viewing geometries (e.g., SAR and FLIR).

According to their methodology, conventional object recognition paradigms are divided into statistical and matched filter recognition systems, non-adaptive model-based recognition systems, and adaptive model-based recognition systems. Statistical and matched filter recognition systems require training on each type of target and scene, are difficult to modify for new missions and their performance is unpredictable outside of the trained domain. Conventional, non-adaptive model-based recognition systems require models for new targets and require tuning of thresholds for each type of scene; moreover, performance on new scenes is unpredictable. Adaptive model-based recognition systems require prior validation of predictive models; however, no tuning is needed for new scenes and performance is predictable.

SUMMARY OF THE INVENTION

The present invention relates to a hierarchical information fusion object recognition system and a method. The method is adapted to a hierarchical real-time SAR/FLIR air-to-ground targeting object recognition system for automated target classification on the detection feature attribute level.

One aspect of the present invention is a hierarchical object recognition method for aggregation, interpretation and classification of information from multiple sensor sources on the detection feature attribute level. The method extracts information derived from each sensor source to obtain detections and their feature attributes, creates a processing stream for each sensor source, for converting the detections and their feature attributes into hypotheses on identity and class of detected objects, and shares and combines the detection feature attributes and hypotheses about the detections between the processing streams using hierarchical information fusion algorithms to determine which ones of the hypotheses on identity and class of detected objects have the highest probabilities.

In the method of the present invention each processing stream has a plurality of processing stages, and the hierarchical information fusion algorithms are performed at each processing stage, with decision nets based on evidential reasoning paradigms, to restrict the hypotheses on identity and class of detected objects. The decision nets are project-defined and knowledge-driven decision nets, preferably selected from the group of Markov tree systems and neural networks. The decision nets are made in modular form to allow easy, rapid and automatic updates from a problem description.

Another aspect of the present invention is a hierarchical object recognition system implementing the method of the present invention. The system has an extraction information engine derived from each sensor source which uses hierarchical information extraction algorithms to obtain the detections and their feature attributes, at least two processing streams, one for each sensor source, and a fusion engine having a fuse decision module for sharing and combining the detection feature attributes and hypotheses about the detections between the two processing streams using hierarchical information fusion algorithms to determine which ones of the hypotheses on identity and class of detected objects have the highest probabilities. Each processing stream has a plurality of processing stages adapted for converting the detections and their feature attributes into hypotheses on identity and class of detected objects.

Yet another aspect of the present invention is a hierarchical real-time SAR/FLIR air-to-ground targeting object recognition system for automated target classification on the detection feature attribute level. The sensors in this aspect are a synthetic aperture radar (SAR) and a forward-look infra-red (FLIR), and the processing stages are SAR processing stages and FLIR processing stages.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DETAILED DESCRIPTION OF THE INVENTION

The present invention relates to a hierarchical model-based object recognition system and method for aggregation and interpretation of information from multiple sensors with different imaging formats and viewing geometries. One aspect of the present invention is a general method for hierarchical information fusion for object recognition. In this method, information from multiple sensor sources, which can be imaging and/or non-imaging sensors from on-board and/or off-board sources, is processed with hierarchical information extraction algorithms and interim results are fused to select detection candidates and restrict target type hypotheses for these candidates. Images can be obtained with different types of sensors, at different times and with different photogrammetric transformations of object space, to obtain data on mutually selected target candidates, roads, structures bodies of water and the like. Derived detection information from several sensor sources is spatially registered to establish the correspondence of common objects and to reject uncorrelated clutter detections. Resulting detection information extracted from these image sources is fused at several fusion engine processing stages, using several decision nets adapted to the type of application, in order to constrain potential classes and identities and reduce the probability of misclassification of detected objects.

The fusion engine decision nets aggregate and interpret information at each stage of the fusion hierarchy. Object classification and recognition are based on Dempster-Shafer evidential reasoning paradigms embedded in the decision nets in the form of Markov trees. These networks apply uniform reasoning to diverse information. They encode rules, probabilities and possibilities; model uncertainty, ignorance and conflict; exploit new information when it is available; and smoothly tolerate missing or asynchronous information. The decision nets are applied hierarchically in the processing stream to reject false alarms, restrict classification and recognition hypotheses for detected objects at early stages of processing, in order to improve recognition performance and to minimize computer throughput requirements.

Figure 1:
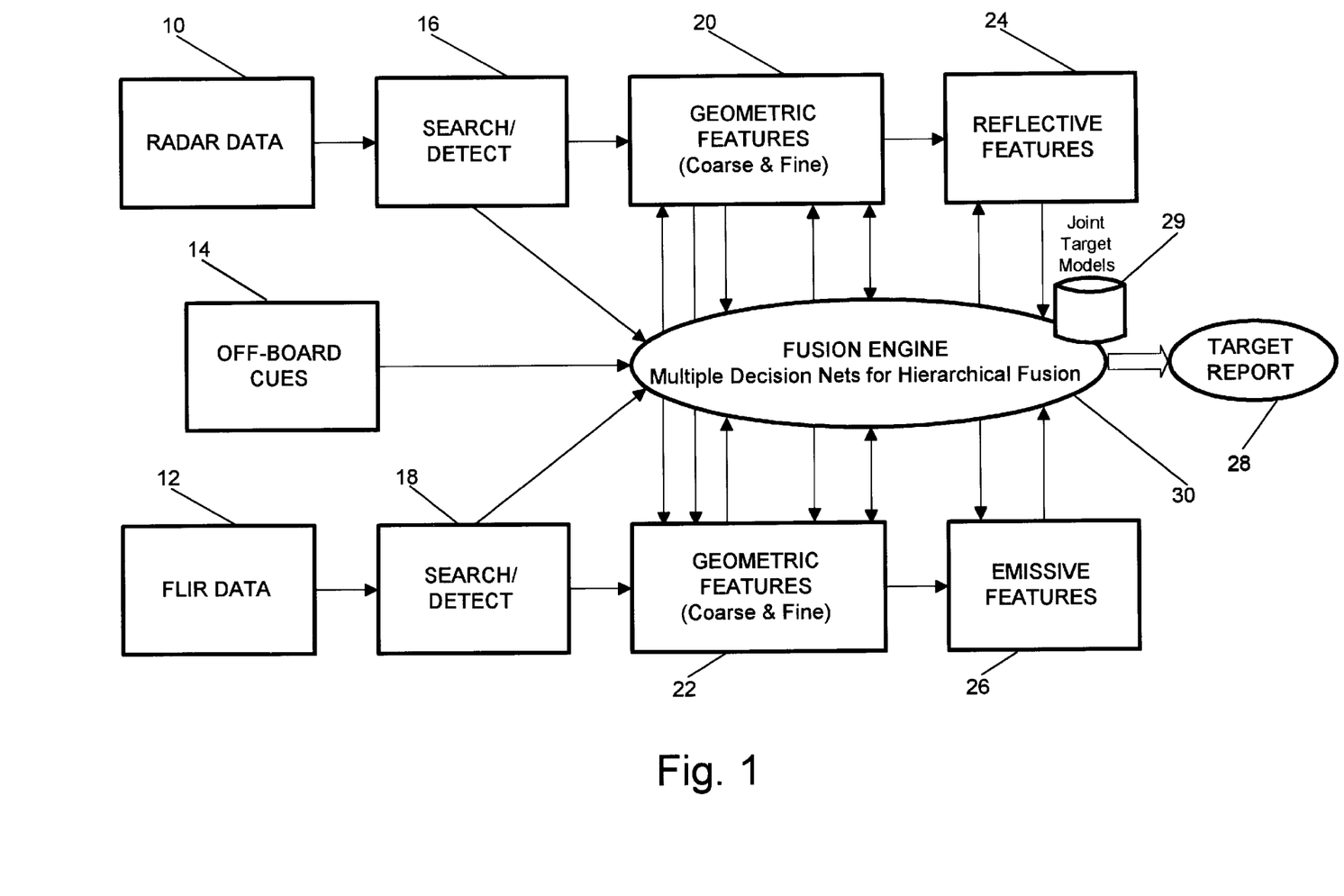
FIG. 1 is a schematic illustration of a general algorithm of a hierarchical information fusion object recognition system and method, adapted for SAR-FLIR air-to-ground reconnaissance or targeting from the aircraft, in accordance with one embodiment of the present invention.

The general method of this invention can be adapted to an exemplary application for SAR/FLIR air-to-ground reconnaissance or targeting, supporting strike aircraft crews with real-time targeting information. The Hierarchical Information Fusion Object Recognition System and method automatically extracts, aggregates and fuses information derived from asynchronous SAR and FLIR images to detect, classify, recognize and prioritize ground targets, providing an effective targeting aid for day and night operations. FIG. 1 is a schematic illustration of a general algorithm of this system, adapted to be performed in aircraft computers, on the information derived from SAR and FLIR sensors, located on the aircraft. Additionally, off-board cues can be fused to improve the targeting solution.

The components of synthetic aperture radar (SAR) and forward-looking infra-red (FLIR) imaging are well known in the art and do not need to be described here or be shown in detail. The hierarchical information fusion object recognition system and method of the present invention is capable of detecting target candidates at long range, it registers and fuses SAR and FLIR detections at moderate range, and it fuses corresponding information from SAR and FLIR image processing to classify and recognize targets. Additionally, through the registration of SAR and FLIR detections, this method improves on FLIR-only, day-operation performance when solar heating creates numerous false detections.

SAR provides excellent all-weather, long-range, wide-area surveillance and detection of target candidates. With shallow depression angle viewing geometries the resulting SAR images provide a plan view representation of the surveillance area. Resulting target signatures are characterized by geometric and reflectivity features. Post-detection processing uses target reflectivity differences relative to the background to estimate object length, width, orientation, fill (number of above-threshold pixels in the best-fit bounding rectangle) and height (from shadow length). The utility of these features for target classification and recognition is a function of the SAR image resolution. When additional FLIR targeting pods are flown on the same aircraft, they can provide moderate-range, high-resolution imagery of selected surveillance areas designated by previous SAR detections. With shallow depression angle viewing geometries the resulting FLIR images provide angle-angle elevation views of the surveillance area. Resulting target signatures are characterized by geometric and thermal emission features (target feature contrast relative to the background), with sufficient spatial resolution to classify and recognize objects.

The preferred method of the present invention is the fusion of information obtained from the SAR and FLIR images on feature attribute and hypothesis levels, not on a pixel level. The pixel level SAR and FLIR images are generated from different viewing geometries and photogrammetric transformations (SAR: range-angle representation; FLIR: angle-angle representation) and are therefore difficult to register and align at the pixel level. Therefore, the present invention improves on the deficiencies of the conventional methods by executing SAR-to-FLIR registration based on image information and not on image pixel data.

The processing steps of the preferred embodiment of the present invention are performed in at least two separate sensor subsystems, each for a different sensor and each having several distinctive stages, although it can work with a single subsystem, but with potentially degraded recognition performance. The processing steps will be described using the aspect of the present invention represented in FIG. 1, which has two sensor subsystems, SAR and FLIR. The SAR sensor subsystem receives radar data 10 and preferably has a radar search/detect stage 16, a radar geometric features extraction stage 20 and a radar reflective features extraction stage 24. The FLIR sensor subsystem receives FLIR data 12 and preferably has a FLIR search/detect stage 18, a FLIR geometric features extraction stage 22 and a FLIR emissive features stage 26.

The detection and object feature information from the SAR subsystem and from the FLIR subsystem are fused by a fusion engine 30, which uses a joint target model database 29 to match extracted object features with stored model features to create a target report 28. The fusion engine 30 has multiple decision nets to provide hierarchical registration of detections from multiple sensor sources; to reject false alarms; to fuse geometric and internal detail features to restrict target hypotheses for each object detection; to provide coarse, then fine classification of the detected objects; to recognize each detected object; and to establish a measure of confidence of the final object recognition decision.

The fusion engine 30 may also use off-board cues 14, if available, which may be received from one or more humans or from instruments, located on the ground or on different air-borne platforms. Off-board cues 14 may be target type, target position, target orientation, target velocity, communication/radiation signatures and the like. In addition, these cues may include information about preferred viewing geometries and important contextual cues in the object's local environment. These cues may be provided as voice messages, data transmissions or reconnaissance imagery into the cockpit.

Figure 2:
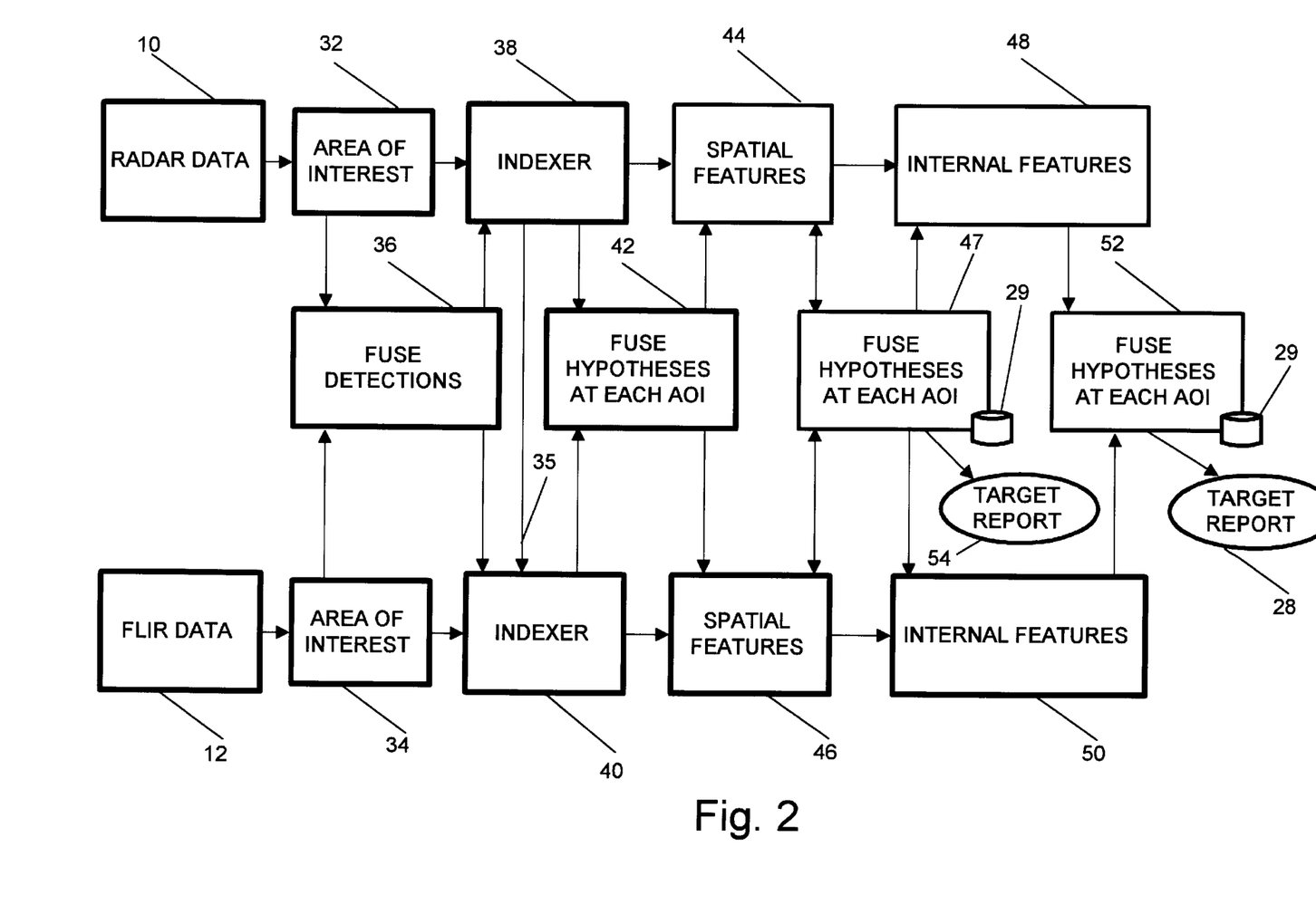
FIG. 2 is a detailed block-diagram illustrating stages of the hierarchical information fusion object recognition system of FIG. 1.

FIG. 2 is a detailed block-diagram illustrating stages of the hierarchical information fusion object recognition system of FIG. 1, developed for SAR-FLIR air-to-ground targeting. In this system, the SAR subsystem and the FLIR subsystem employ several, preferably four, separate fusion decision nets to fuse and interpret information at several, preferably four, sequential stages of the processing stream. The stages of the SAR subsystem are a radar area of interest stage 32, a radar indexer stage 38, a radar spatial features stage 44, and a radar internal features stage 48. The FLIR subsystem stages are a FLIR area of interest stage 34, a FLIR indexer stage 40, a FLIR spatial features stage 46, and a FLIR internal features stage 50.

SAR and FLIR subsystems input separate and different images containing radar data 10 and FLIR data 12. In the radar area of interest stage 32 and the FLIR area of interest stage 34 these images are independently processed with contrast and object-size detection algorithms in order to find areas of interest (AOIs). The detected objects from the SAR and FLIR subsystems are submitted to a fuse detections stage 36.

This stage registers the SAR and FLIR detections by transforming the positions of the FLIR detections from FLIR area of interest determination stage 34 into the SAR map coordinate system. The fuse detections stage 36 rejects false alarms from the area of interest stages 32 and 34 by exploiting the fact that clutter detections are nominally uncorrelated in the SAR and FLIR images, while target detections are correlated and align spatially.

FIG. 2 illustrates two important processes of the present invention: fusion of detections and fusion of information. Fusion of detections is performed in the fuse detection stage 36 to confirm registration and reject false alarms for subsequent stages of classification/recognition processing. Information extraction and aggregation are performed at the indexer stages 38, 40, spatial features stages 44, 46, internal features stages 48, 50, and fusion at first, second and third fuse hypotheses stages 42, 47, 52. Each fuse hypotheses stage 42, 47, 52 fuses aggregated information to restrict hypotheses and processor throughput for subsequent stages of processing, to increase confidence in the resulting hypotheses, and to provide target reports 54 and 28 at those stages where the aggregated information supports target recognition decisions.

Radar indexer stage 38 and FLIR indexer stage 40 perform indexing for coarse object classification, by comparing object geometric features with the joint target model database 29. They extract features for each detected object. SAR features include object range, size, plan view shape, orientation (on the ground plane) and height (from shadow length); FLIR features include the object silhouette and internal contrast boundaries. Features are shared between the two indexer stages to reduce image and feature ambiguities in the individual sensor images, and to restrict candidate hypotheses for indexer coarse classification and for subsequent recognition stages. In this example, SAR features of range, target size, target shape and target orientation (pose on the ground plane) are passed to the FLIR indexer 40 to eliminate ambiguities in these features. SAR features to constrain FLIR hypotheses path 35 is used to restrict candidate hypotheses in FLIR subsystem processing. Hypothesis restriction equates to improved classification and recognition performance, and reduced processing requirements for the subsequent throughput intensive processing stages. In this example, the processor throughput savings in spatial features determination stages 46, 50 is greater than all the processor throughput required for radar area of interest determination stage 32, radar indexer stage 38 and fuse detections stage 36.

At this stage, detected objects are coarsely classified by size and shape as tank-like, truck-like, SCUD-like, etc., by each of the indexer stages 38 and 40. An ordered hypothesis list of potential classifications is generated for each detected object, by each indexer stage 38, 40. These ordered hypothesis lists are fused in the first fuse hypotheses stage 42 at each AOI, using a decision net designed to interpret the relevant feature and hypothesis evidence at this stage of processing. The resulting list of potential classifications for each AOI is used as a best recommendation for the next stage.

In the present invention, the sharing of information between the two subsystems gives a reduced hypothesis list for each detected object and higher confidence levels. From this point on, the processing could continue in each subsystem in parallel, and the information shared between them. However, in this particular application involving SAR-FLIR air-to-ground targeting, the SAR subsystem processing stops because the SAR camera does not have sufficient spatial resolution to support spatial and internal feature extraction and interpretation for target recognition. Processing continues for the FLIR subsystem.

Radar spatial features stage 44 is not used in this aspect but is designed, together with the FLIR spatial features stage 46 and the second fuse hypotheses stage 47 to extract high-resolution spatial features, both silhouette and internal geometric shapes, and match these feature sets to corresponding geometric models of the candidate hypotheses for each AOI. The output of the second fuse hypotheses stage 47 is a list of remaining target hypotheses and a target report 54 which provides a recognition decision based on the aggregation and interpretation of spatial feature information from spatial features determination stages 44 and 46 in the second fuse hypotheses stage 47. This ordered list of recognition candidates is input to the internal features determination stages 48, 50 to restrict hypotheses for internal feature extraction and matching.

The FLIR internal features stage 50, and the radar internal features stage 48 predict, extract and match finer details and aggregate more detailed information to improve target recognition performance. Internal detail processing stages 48, 50 use, for example, two-dimensional SAR radar cross-section maps and two-dimensional FLIR spatial distributions of regions of uniform thermal emissions to confirm the results obtained with the spatial feature processing and provide the final target recognition decision, i.e., at this stage the detections can be recognized by vehicle model, e.g., tank type T-72.

The final stage of processing and fusion is the third fuse hypotheses stage 52 with a decision net which aggregates and interprets recognition hypotheses and associated SAR and FLIR internal feature distributions, both to confirm results of spatial feature processing and to provide the final target recognition report 28. The final target report 28 is created from a fused list of hypotheses from the second fuse hypotheses stage 47 and is a final ordered list of target recognitions with corresponding confidence levels associated with these choices.

The fusion engine 30 (FIG. 1) enabling the hierarchical information fusion process of the present invention preferably is designed as a set of fusion engines, one for each processing stage, each having its own decision net. Each decision net is preferably an implementation of a valuation-based systems (VBS) theory, developed by P. P. Shenoy, implemented as a valuation-based computer model, implementing a variety of uncertainty reasoning and optimization functions, such as the Dempster-Shafer theory of evidential reasoning. P. P. Shenoy's theory is described in "*A Valuation-based Language For Expert Systems,*" International Journal For Approximate Reasoning (1989), Vol. 3(5), pp. 383–411 and in chapter 18—"*Using Dempster-Shafer's belief-function theory in Expert Systems*"—of the book "*Advances in the Dempster-Shafer Theory of Evidence*" (1991), pp. 395–414, R. R. Yager et al. editors, John Wiley & Sons, Inc.

The VBS formalization allows for any problem description to be represented as a valuation-based network, with nodes that correspond to problem variables and relations between them, and with belief probability assignments attributable to both variables and relations. A Markov tree network can be generated from each valuation-based network, in order to carry out a belief propagation process from node to node, and assign each node, including the output decision node, a belief which is a combination of its previous belief and its neighbor's new belief.

Figure 3:
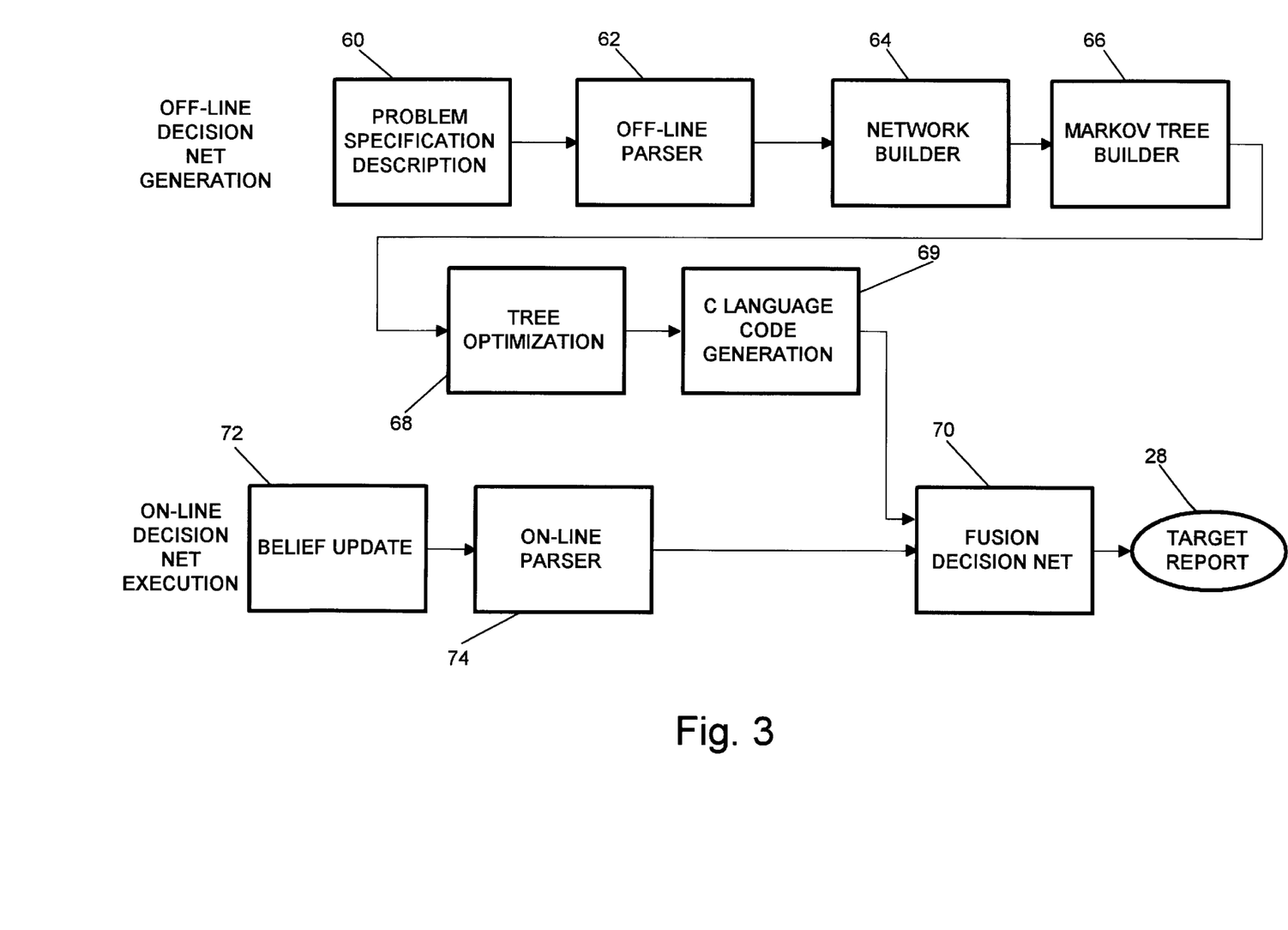
FIG. 3 is a block diagram illustrating off-line fusion decision net generation and real-time on-line decision net execution in the system of FIG. 1.

FIG. 3 is a block diagram illustrating off-line fusion decision net generation and real-time on-line decision net execution (belief propagation and updating) of the system of FIG. 1. Each decision net of the present invention is preferably problem-defined and is, therefore, derived from a Markov tree network representing the evidence and interpretation rules at each stage of the processing. Preferably, each fusion decision net 70 is automatically created from a problem specification description 60, using off-line and on-line processing. Off-line fusion decision net generation includes a User Interface Language (UIL) that supports problem structuring for valuation based belief propagation, an off-line language parser 62 that reads the UIL problem specification description 60 and passes the algorithms. The output from the off-fine language parser 62 is sent to a network builder 64 which creates a valuation-based network representation of the evidential reasoning problem and initiates its data structures. A Markov tree builder 66 then converts this valuation-based network into a Markov tree. This Markov tree is optimized in a tree optimization module 68 to facilitate real-time processing, and node connections are rearranged so that no node of the Markov tree has more than three neighbors. A "C" language code generator 69 then translates this optimized tree into the real-time decision net. All these steps are performed off-line and can easily and rapidly facilitate insertion of additional information.

The on-line decision net execution phase accepts belief updates 72 from one or more sensor processing streams. These belief updates, written in UIL format, are read by the on-line language parser 74 and sent to the fusion decision net 70, where the beliefs are propagated through the optimized Markov tree to update the recognition hypotheses and associated confidence metrics in the output target report 28.

Figure 4:
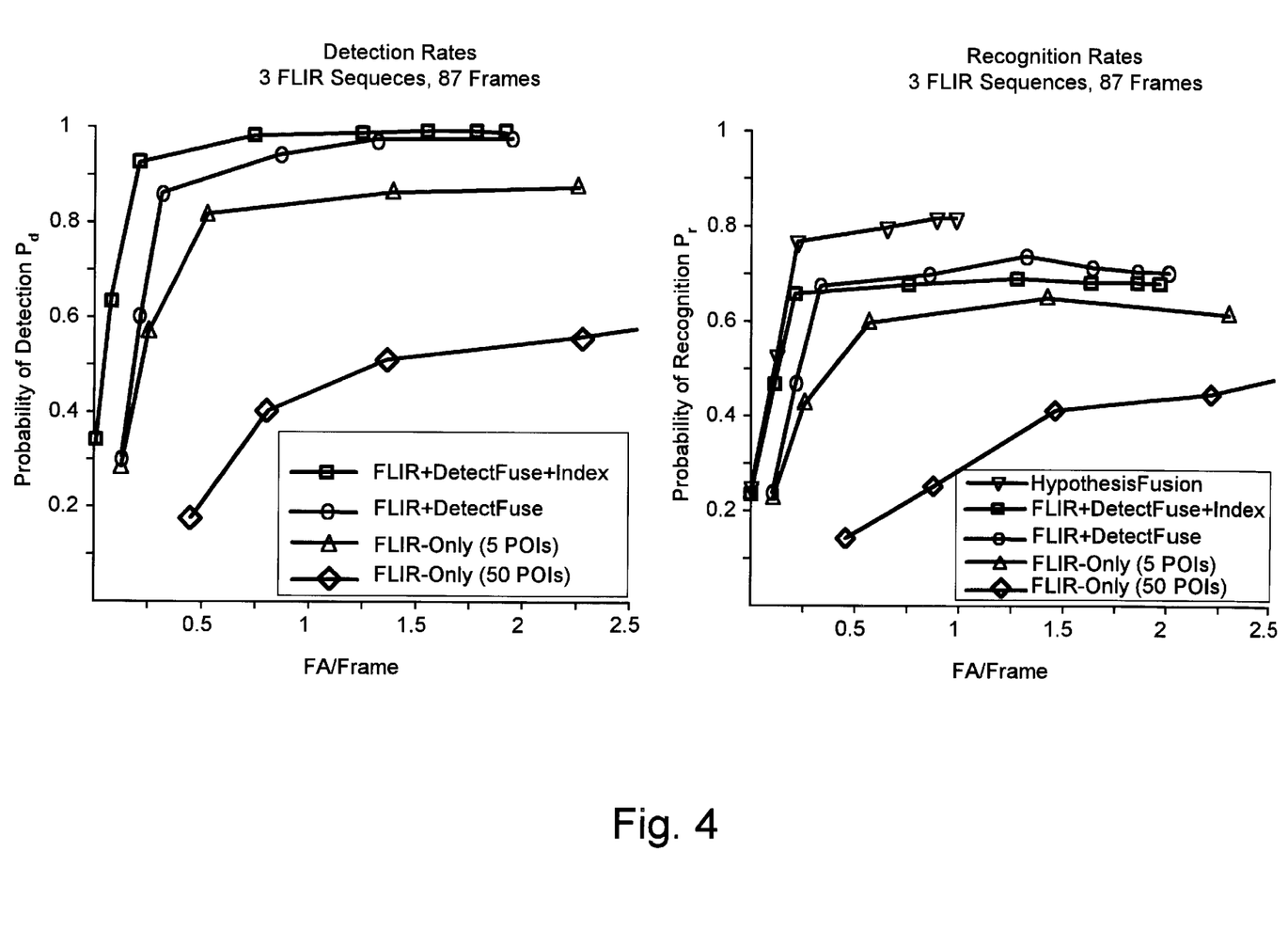
FIG. 4 is a graph illustrating the performance benefits of SAR/FLIR fusion, relative to FLIR-only model-based ATR processing. The graphs illustrate probabilities of detection and recognition as a function of false alarm rate for the several stages of fusion.

The stages presented in FIG. 2 with thicker lines have been simulated using 4×6 foot SAR imagery and high-resolution FLIR imagery. Simulation results, illustrated in the ROC graphs of FIG. 4, show the performance improvement in probabilities of detection, $P_d$, and recognition, $P_r$, as a function of false alarm rate (FA), compared to FLIR-only, automatic target recognition processing. FLIR-only processing is indicated by the lower two curves (diamond and triangle keys); the lowest curves (diamond key) characterize FLIR-only performance with no a priori knowledge of the number of targets present. Therefore a lower detection threshold is used, allowing more target candidates to be detected, but at the cost of additional false alarms. The upper FLIR-only curve (triangle key) assumes a priori knowledge of the number of targets present, restricts the number of target candidates, and results in improved detection and recognition performance (fewer false alarms).

The benefit of fuse detection 36 in FIG. 2 is illustrated by the detection and recognition curves with the circle keys. The curve movement up and to the left indicates improving performance; thus, detection registration which has the effect of rejecting false alarms (uncorrelated detections in the two sensor modalities) improves both detection and recognition performance.

The benefit of using SAR features to both reject non-target-like detections and to constrain hypothesis space for FLIR indexer 40 and recognition processing is illustrated by the curve with the square key. As shown by the curves, both false detections and target misclassifications are mitigated using these features. The final curve (upper-most and left-most curve with the inverted triangle key), shown for probability of recognition only, illustrates the performance improvement derived from the fuse hypotheses stage 42 in FIG. 2. Misclassifications are substantially reduced by this stage. Therefore, the curves of FIG. 4 illustrate performance improvement from hierarchical fusion, and increased probabilities of detection and recognition, accompanied by reduced false alarm rates, for each fusion stage and for the total fusion process.

The present invention can be implemented with a great variety of on-board and off-board sensors. Off-board sensors that can be used with this system are reconnaissance SARs, foliage penetration radars, reconnaissance visible and IR cameras, signal intelligence (SigInt) sensors and the like. On-board sensors can be SAR, real beam radars, broad-band and multicolor IR and visible sensors, laser radars and the like.

The modules of the hierarchical information fusion object recognition system of the present invention are implemented in computer software programs. Presently, these software programs have to run on a computer having multiple processors, including vector processors, which preferably are dynamically reconfigurable to support shared processing for the several sensor modalities. For real-time operations, the computer needs a real-time operating system, typically interrupt-driven, and must be capable of processing several large images of 500,000 pixels or more. The several stages of the hierarchical information fusion recognition system are structured independent software modules, preferably written in "C" or a similar higher order language suitable for real-time applications. Decision nets of the fusion engine are knowledge driven and can be implemented as Markov trees or neural networks.

The method of the present invention is applicable to some civilian applications, including systems for inspection purposes, which may use a combination of X-ray machines and IR sensors. They can be used to detect corrosion or cracks under painted surfaces, like the ones found on aircraft riveted joints. In addition, the method of the present invention can be used for traffic control, including ship recognition and tracking harbor traffic control. In military applications the method of the present invention is suitable for many object recognition systems, which include systems for classification of ground and airborne targets.

In summary, the method of the present invention embodies several unique features, with resulting benefits to the performance of the resulting object recognition systems. First, the hierarchical information fusion recognition system embodies the several algorithmic stages for model-based object recognition in each sensor subsystem. Therefore, it can recognize new object classes with the simple addition of models that characterize the object classes; no extensive retraining of the system is required. Second, the system fuses information, not pixel data. Therefore, pixel-level registration is not required, and detection/feature extraction algorithms can be used to reject clutter and selectively identify candidates for subsequent fusion stages. Third, the fusion hierarchy rapidly prunes hypothesis space for the target candidates prior to the processor throughput-intensive spatial and internal feature extraction and matching stages. The net result is reduced processor throughput and/or processing timelines, simultaneous with improved performance. Fourth, the decision nets effectively execute evidential reasoning in a real-time software system. They encode rules, probabilities, possibilities; they model uncertainty, ignorance and conflict; they asynchronously update beliefs; and their performance degrades gracefully with missing data. Fifth, the combination of these several elements substantially improves recognition performance while simultaneously reducing false alarm rates.

While this invention has been described with reference to its presently preferred embodiment(s), its scope is only limited insofar as defined by the following set of claims and all equivalents thereof.

We claim:

1. A hierarchical object recognition method for aggregation, interpretation and classification of information from multiple sensor sources on the detection feature attribute level, comprising the following steps:

extracting information derived from each said sensor source to obtain detections and their feature attributes;

providing at least two processing streams, one for each said sensor source, for converting said detections and their feature attributes into hypotheses on identity and class of detected objects;

fusing said hypotheses at different feature levels for each said processing streams via hierarchical information fusion algorithms; and sharing and combining the detection feature attributes and hypotheses about the detections between the two processing streams using said hierarchical information fusion algorithms to determine which ones of said hypotheses on identity and class of detected objects have the highest probabilities, and providing said fused hypotheses to said processing streams for determining hypotheses based on said feature attributes.

2. The method as claimed in claim 1, wherein:

each said processing stream has a plurality of processing stages, and said hierarchical information fusion algorithms are performed at each said processing stage with decision nets based on evidential reasoning paradigms, to restrict the hypotheses on identity and class of detected objects and reduce the probability of misclassification of detected objects.

3. The method as claimed in claim 2, wherein the decision nets are project-defined and knowledge-driven decision nets, selected from the group of Markov tree systems and neural networks.

4. The method as claimed in claim 3, further comprising the step of:

generating and updating the decision nets automatically from a problem description, and wherein the decision nets are made in modular form to allow easy and rapid updates.

5. The method as claimed in claim 1, wherein the method is adapted for a hierarchical real-time SAR/FLIR air-to-ground targeting object recognition system for automated target classification on the detection feature attribute level, each said processing stream has a plurality of processing stages, the sensors are a synthetic aperture radar (SAR) and a forward-look infra-red (FLIR), said processing stages are SAR processing stages and FLIR processing stages, further comprising:

a spatial registration module for spatial registration of the detections from said multiple sensor sources to establish correspondences of common objects and to reject uncorrelated clutter detections, wherein the sensor sources include on-board and off-board sensor sources; and an off-board cues module for accepting off-board cues including information about target type, target position, target orientation, target velocity, and communication/radiation signatures.

6. The method as claimed in claim 5, wherein:

said hierarchical information fusion algorithms are performed at each said processing stage with decision nets based on evidential reasoning paradigms, to restrict the hypotheses on identity and class of detected objects and reduce the probability of misclassification of detected objects, wherein at least one of said processing stages receives from said fusion algorithms the restricted hypotheses for feature processing, and the decision nets are project-defined and knowledge-driven decision nets, selected from the group of Markov tree systems and neural networks.

7. The method as claimed in claim 6, further comprising the step of:

generating and updating the decision nets automatically from a problem description, and wherein the decision nets are made in modular form to allow easy and rapid updates.

8. A hierarchical object recognition method for aggregation, interpretation and classification of information from multiple sensor sources on the detection feature attribute level, wherein the method is adapted for a hierarchical real-time SAR/FLIR air-to-ground targeting object recognition system for automated target classification on the detection feature attribute level, comprising the following steps:

extracting information derived from each said sensor source to obtain detections and their feature attributes;

providing at least two processing streams, one for each said sensor source, for converting said detections and their feature attributes into hypotheses on identity and class of detected objects;

providing a plurality of fusion engines having hierarchical information fusion algorithms for fusing said hypotheses at different feature levels for each said processing streams; and sharing and combining the detection feature attributes and hypotheses about the detections between the two processing streams using hierarchical information fusion algorithms to determine which ones of said hypotheses on identity and class of detected objects have the highest probabilities, and at least one of said fusion engines providing said fused hypotheses of said one fusion engine to said processing streams for determining hypotheses based on said feature attributes.

9. The method as claimed in claim 8, wherein:

each said processing stream has a plurality of processing stages, the sensors are a synthetic aperture radar (SAR) and a forward-look infra-red (FLIR), said processing stages are SAR processing stages and FLIR processing stages, further comprising:
- a spatial registration module for spatial registration of the detections from said multiple sensor sources to establish correspondences of common objects and to reject uncorrelated clutter detections, wherein the sensor sources include on-board and off-board sensor sources; and
- an off-board cues module for accepting off-board cues including information about target type, target position, target orientation, target velocity, and communication/radiation signatures.

10. The method as claimed in claim 9, wherein:

said hierarchical information fusion algorithms are performed at each said processing stage with decision nets based on evidential reasoning paradigms, to restrict the hypotheses on identity and class of detected objects and reduce the probability of misclassification of detected objects.

11. The method as claimed in claim 10, wherein the decision nets are project-defined and knowledge-driven decision nets, selected from the group of Markov tree systems and neural networks.

12. The method as claimed in claim 11, further comprising the step of:

generating and updating the decision nets automatically from a problem description, and wherein the decision nets are made in modular form to allow easy and rapid updates.

13. A hierarchical object recognition system for aggregation, interpretation and classification of information from multiple sensor sources on the detection feature attribute level, said system comprising:

an extraction information engine derived from each said sensor source using hierarchical information extraction algorithms to obtain detections and their feature attributes;

at least two processing streams, one for each said sensor source, each said processing stream having a plurality of processing stages adapted for converting said detections and their feature attributes into hypotheses on identity and class of detected objects; and a fusion engine having a fuse decision module for sharing and combining the detection feature attributes and hypotheses about the detections between the at least two processing streams using hierarchical information fusion algorithms to determine which ones of said hypotheses on identity and class of detected objects have the highest probabilities, said fusion engine sharing and combining the hypotheses of at least one of said processing stages for each said sensor source in order to provide the combined hypotheses to another one of said processing stages for determining hypotheses based on said feature attributes.

14. The system as claimed in claim 13, wherein:

each said processing stream comprising:
- an area of interest stage,
- an indexer stage, wherein at least one of said indexer stages generates feature data based upon data provided by at least one of said fusion engines and by another indexer stage,
- a spatial features stage, and
- an internal features stage, the extraction information engine has a fuse detections stage which confirms the objects detected by each said processing stream, the fuse decision module comprises at least one fuse hypotheses stage for fusing aggregated detections from each processing stream to restrict the set of hypotheses for the subsequent stages of processing, and the area of interest stage includes:
- a search/detect stage,
- a geometric features extraction stage, and
- a reflective features extraction stage.

15. The system as claimed in claim 13, wherein said hierarchical information fusion algorithms are performed at each said processing stage with decision nets based on evidential reasoning paradigms, to restrict the hypotheses on identity and class of detected objects and reduce the probability of misclassification of detected objects.

16. The system as claimed in claim 15, wherein the decision nets are project-defined and knowledge-driven decision nets, selected from the group of Markov tree systems and neural networks, generated and updated automatically from a problem description, and made in modular form to allow easy and rapid updates.

17. The system as claimed in claim 13, wherein:

said system is a hierarchical real-time SAR/FLIR air-to-ground targeting object recognition system for automated target classification on the detection feature attribute level, the sensors are a synthetic aperture radar (SAR) and a forward-look infra-red (FLIR), said processing stages are SAR processing stages and FLIR processing stages, further comprising:
- a spatial registration module for spatial registration of the detections from said multiple sensor sources to establish correspondences of common objects and to reject uncorrelated clutter detections, wherein the sensor sources include on-board and off-board sensor sources; and
- off-board cues module for accepting off-board cues including information about target type, target position, target orientation, target velocity, and communication/radiation signatures.

18. The system as claimed in claim 17, wherein said hierarchical information fusion algorithms are performed at each said processing stage with decision nets based on evidential reasoning paradigms, to restrict the hypotheses on identity and class of detected objects and reduce the probability of misclassification of detected objects.

19. The system as claimed in claim 18, wherein the decision nets are project-defined and knowledge-driven decision nets, selected from the group of Markov tree systems and neural networks, generated and updated automatically from a problem description, and made in modular form to allow easy and rapid updates.

20. The system as claimed in claim 19, wherein:
the SAR subsystem comprising:
a radar area of interest stage,
a radar indexer stage,
a radar spatial features stage, and
a radar internal features stage,
the FLIR subsystem comprising:
a FLIR area of interest stage,
a FLIR indexer stage,
a FLIR spatial features stage, and
a FLIR internal features stage,
the extraction information engine has a fuse detections stage which confirms the objects detected by both the SAR and the FLIR subsystem,
the fuse decision module comprises at least one fuse hypotheses stage for fusing aggregated detections from the SAR and FLIR subsystem to restrict the set of hypotheses for the subsequent stages of processing,
the radar area of interest stage includes:
a radar search/detect stage,
a radar geometric features extraction stage, and
a radar reflective features extraction stage, and
the FLIR area of interest stage includes:
a FLIR search/detect stage,
a FLIR geometric features extraction stage, and
a FLIR emissive features stage.

21. A hierarchical information fusion target recognition system for classifying targets based upon target data from a plurality of sensor sources:
an information extraction engine for processing target data from each of said sensor sources at different feature levels in order to formulate target hypotheses regarding classification of said targets;
a plurality of fusion engines connected to said information extraction engine for fusing target hypotheses at each of said different feature levels from said sensor sources, and at least one of said fusion engines providing said fused target hypotheses of said one fusion engine to said information extraction engine for determining hypotheses on identity and class of detected objects; and
a target list generator connected to said fusion engines for generating a list of targets based upon said fused target hypotheses.

22. The hierarchical information fusion target recognition system of claim 21 wherein said different feature levels include spatial features and internal features related to said target.

23. The hierarchical information fusion target recognition system of claim 22 wherein said internal features relate to reflective and emissive features of said targets.

24. The hierarchical information fusion target recognition system of claim 21 further comprising:
a detections fusion engine for fusing detections of said sensor sources in order to detect false alarms in classifying targets, said detections fusion engine performing said detections based upon correlating area of interest data from said sensor sources, said detections fusion engine providing said fused detections to said information extraction engine for processing target data at a predetermined feature level.

25. The hierarchical information fusion target recognition system of claim 21 further comprising:

first and second indexer stages being respectively associated with a first and second sensor source for formulating first and second hypotheses regarding target classification based respectively upon said target data of said first and second sensor sources,
said first indexer stage generating first geometric feature data based upon target data from said first sensor,
said first indexer stage providing said first geometric data to said second indexer stage,
said second indexer stage generating second geometric feature data based upon target data from said second sensor and upon said provided first geometric data,
said second indexer stage formulating said second hypotheses regarding target classification of said target data from said second sensor source; and
a hypotheses fusion engine connected to said first and second indexer stages for fusing said first and second formulated hypotheses,
wherein said target list generator classifies targets based upon said fused first and second hypotheses.

26. The hierarchical information fusion target recognition system of claim 25 further comprising:
a detections fusion engine for fusing detections of said sensor sources in order to detect false alarms in classifying targets, said detections fusion engine performing said detections based upon correlating area of interest data from said sensor sources, said detections fusion engine providing said fused detections to said information extraction engine for processing target data at a predetermined feature level,
said first and second indexer stages utilizing said generated fused detections from said detections fusion engine in order to formulate said first and second hypotheses.

27. The hierarchical information fusion target recognition system of claim 25 further comprising:
a joint target model database for storing model geometric features of predetermined types of targets,
said first and second indexer stages comparing said determined first and second geometric feature data with said stored geometric model features in order to formulate first and second hypotheses.

28. The hierarchical information fusion target recognition system of claim 25 further comprising:
first and second spatial features stages being respectively associated with a first and second sensor source,
said first and second spatial features stages formulating first and second spatial hypotheses regarding target classification based respectively upon said target data of said first and second sensor sources and upon said fused first and second hypotheses from said first and second indexer stages; and;
a spatial features hypotheses fusion engine connected to said first and second spatial features stages for fusing said first and second formulated spatial hypotheses,
wherein said target list generator classifies targets based upon said fused first and second spatial hypotheses.

29. The hierarchical information fusion target recognition system of claim 21 wherein said fusion engines include decision nets which utilize evidential reasoning paradigms in order to fuse hypotheses regarding said target data.

* * * * *